US011881368B2

(12) United States Patent
Takeda

(10) Patent No.: US 11,881,368 B2
(45) Date of Patent: Jan. 23, 2024

(54) THERMAL PROTECTOR

(71) Applicant: UCHIYA THERMOSTAT CO., LTD., Saitama (JP)

(72) Inventor: Hideaki Takeda, Saitama (JP)

(73) Assignee: UCHIYA THERMOSTAT CO., LTD.

( * ) Notice: Subject to any disclaimer, the term of this patent is extended or adjusted under 35 U.S.C. 154(b) by 0 days.

(21) Appl. No.: 18/008,853

(22) PCT Filed: Jul. 6, 2021

(86) PCT No.: PCT/JP2021/025402
§ 371 (c)(1),
(2) Date: Dec. 7, 2022

(87) PCT Pub. No.: WO2022/009862
PCT Pub. Date: Jan. 13, 2022

(65) Prior Publication Data

US 2023/0223225 A1 Jul. 13, 2023

(30) Foreign Application Priority Data

Jul. 6, 2020 (JP) ................................ 2020-116407

(51) Int. Cl.
*H01H 37/52* (2006.01)
*H01H 37/04* (2006.01)

(52) U.S. Cl.
CPC ............ *H01H 37/52* (2013.01); *H01H 37/04* (2013.01)

(58) Field of Classification Search
CPC ............................... H01H 37/52; H01H 37/04
See application file for complete search history.

(56) References Cited

U.S. PATENT DOCUMENTS 4,689,599 A * 8/1987 Calenda ................. H01H 37/54 337/380
6,577,223 B2 * 6/2003 Takeda ................... H01H 1/504 337/377

(Continued)

FOREIGN PATENT DOCUMENTS

JP S53103572 U 8/1978
JP 2002124172 A 4/2002

(Continued)

OTHER PUBLICATIONS

International Search Report for PCT/JP2021/025402 dated Sep. 21, 2021. 4 pgs.

*Primary Examiner* — Stephen S Sul
(74) *Attorney, Agent, or Firm* — Lerner David LLP

(57) ABSTRACT

A thermal protector includes: a first terminal and a second terminal that are provided at both ends in a longitudinal direction and connected to an external circuit; an insulation block that holds the first terminal and the second terminal; a fixed contact and a movable contact capable of coming into contact with each other; a movable plate having the movable contact provided at a leading end; and a bimetal engaged with the movable plate. Each of the first terminal and the second terminal has a main body, an extension, and a slit. The main body of the first terminal and the main body of the second terminal lie in a first plane, and a fixed contact support part of the extension and a movable plate support part of the extension lie in a second plane. An angle formed by the first plane and the second plane is an acute angle.

7 Claims, 6 Drawing Sheets

(56) References Cited

U.S. PATENT DOCUMENTS

| | | | | |
|---|---|---|---|---|
| 10,854,404 | B1 * | 12/2020 | Li | H01H 37/64 |
| 2002/0044039 | A1 | 4/2002 | Takeda | |
| 2004/0075526 | A1 * | 4/2004 | Takeda | H01H 37/5418<br>337/36 |
| 2017/0294281 | A1 * | 10/2017 | Takeda | H01H 37/54 |
| 2017/0365428 | A1 * | 12/2017 | Takeda | H01H 37/60 |
| 2018/0053613 | A1 | 2/2018 | Takeda | |

FOREIGN PATENT DOCUMENTS

| | | | |
|---|---|---|---|
| JP | 6612245 | B2 | 11/2019 |
| WO | 2016174794 | A1 | 11/2016 |

* cited by examiner

THERMAL PROTECTOR

CROSS-REFERENCE TO RELATED APPLICATION

The present application is a national phase entry under 35 U.S.C. § 371 of International Application No. PCT/JP2021/025402 filed Jul. 6, 2021, which claims priority from 2020-116407 filed Jul. 6, 2020, all of which are incorporated herein by reference.

TECHNICAL FELD

The present invention relates to a thermal protector that opens and closes an electrical circuit to prevent overheating of an electrical product.

BACKGROUND ART

Thermal protectors are used in electrical products that generate hot air, such as hair dryers and fan heaters, to prevent overheating due to blockage of a blow-out opening or a suction opening or a decrease in motor speed. As an example of thermal protectors, a bimetallic thermal protector is described in Patent Document 1.

CITATION LIST

Patent Document

[Patent Document 1] Japanese Patent No. 6612245

SUMMARY OF INVENTION

Technical Problem

The thermal protector described in Patent Document 1 includes bent parts to prevent a region between two insulation blocks from being affected by an external force. These bent parts are formed by two-step bending in press-working of a metal plate after resin molding. Thus, processing parts by this two-step bending involves relatively high complexity.

In view of this situation, the present invention aims to provide a thermal protector for which processing of parts involves less complexity.

Solution to Problem

A thermal protector according to the present invention includes: a first terminal and a second terminal that are provided at both ends in a longitudinal direction and connected to an external circuit; an insulation block that holds the first terminal and the second terminal; a fixed contact and a movable contact capable of coming into contact with each other; a movable plate having the movable contact provided at a leading end; and a bimetal engaged with the movable plate. Each of the first terminal and the second terminal has a main body, an extension, and a slit extending between the main body and the extension in a width direction of the thermal protector. The fixed contact is provided in a fixed contact support part of the extension of the first terminal. A base end of the movable plate is secured to a movable plate support part of the extension of the second terminal. The main body of the first terminal and the main body of the second terminal lie in a first plane. The fixed contact support part and the movable plate support part lie in a second plane. An angle formed by the first plane and the second plane is an acute angle.

DESCRIPTION OF EMBODIMENTS

Figure 1:
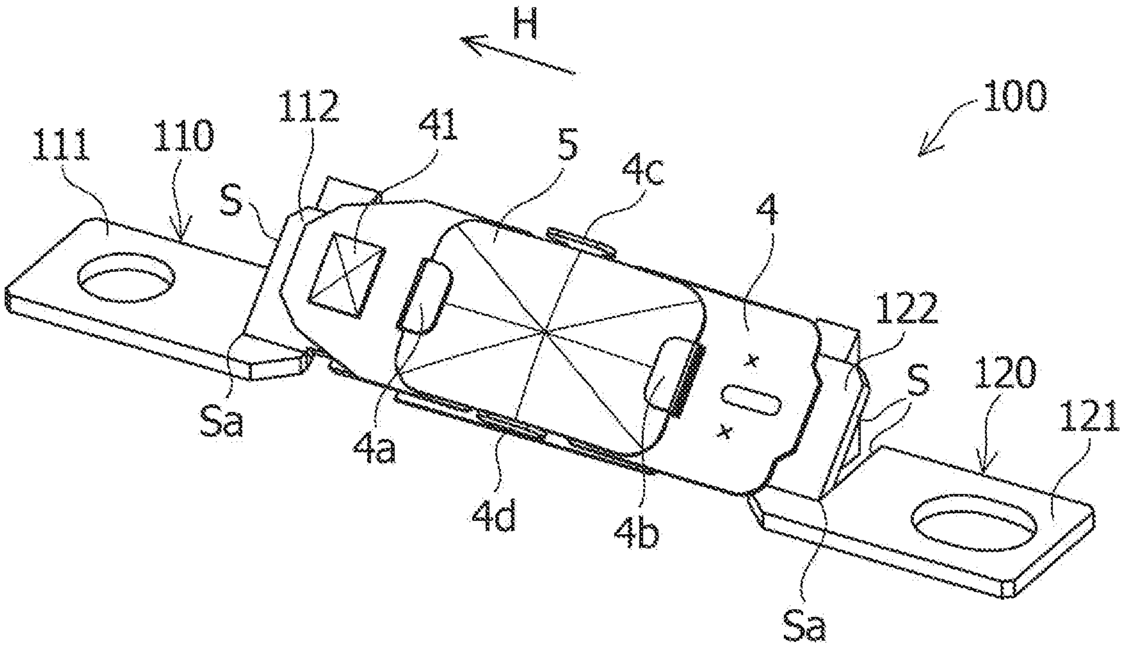
FIG. 1 is a perspective view of a thermal protector in a first embodiment.

The present invention will be described below based on embodiments shown in the drawings. However, the present invention is not limited by the embodiments to be described below.

First Embodiment

FIG. 1 to FIG. 4 show a thermal protector 100 that is a long thin circuit component. The thermal protector 100 is installed in a hair dryer or the like that is one of electrical products that generate hot air. The thermal protector 100 includes a first terminal 110 and a second terminal 120 provided at both ends in a longitudinal direction. Both terminals are connected to an electrical circuit of the hair dryer or the like (a circuit on an outside as seen from the thermal protector 100). As one example, the dimension of the thermal protector 100 in the longitudinal direction is about 3 cm to 4 cm.

An insulation plate 9 is provided inside a tubular case CS of the hair dryer. The insulation plate 9 is formed by engaging cuts that are formed at central portions in a width direction of two mica plates 9*a*, 9*b*, toward opposite directions from each other along a length direction, and has a cross shape as a whole. The insulation plate 9 is disposed inside the case CS such that an intersection 9C of the two mica plates 9*a*, 9*b* is parallel to an axial direction of the case CS. A nichrome wire 9*d* is spirally wound on an outer periphery of the insulation plate 9. An axis of this spiral is parallel to the axis of the case CS. A direction in which hot air flows inside the case CS is indicated by an arrow H.

The thermal protector 100 is disposed near the intersection 9*c* of the insulation plate 9, parallel to the axial direction of the case CS, such that the first terminal 110 is downwind of hot air and the second terminal 120 is upwind of hot air. A part of the insulation plate 9 near the intersection 9*c* will also be referred to as a corner of the insulation plate 9.

The first terminal 110 and the second terminal 120 have nearly symmetrical structures with respect to a line that passes through the center of the thermal protector 100 and is orthogonal to the longitudinal direction of the thermal protector 100 as the axis of symmetry. First, the second terminal 120 will be described.

The second terminal 120 is created by processing a flat metal plate. The second terminal 120 includes a main body 121 located on an outer side in a longitudinal direction, an extension 122 located on an inner side in the longitudinal direction, and a slit S. The slit S is formed between the main body 121 and the extension 122 so as to extend in the width direction from one end of two ends of the second terminal 120 in the width direction that is on the side of the corner of the insulation plate 9.

The first terminal 110 is similar to the second terminal 120. Specifically, the first terminal 110 is also created by processing a flat metal plate. The first terminal 110 includes a main body 111 located on an outer side in a longitudinal direction, an extension 112 located on an inner side in the longitudinal direction, and a slit S. The slit S is formed between the main body 111 and the extension 112 so as to extend in a width direction from one end of two ends of the first terminal 110 in the width direction that is on the side of the corner of the insulation plate 9.

In the first terminal 110, the main body 111 is bent downward relative to the extension 112, with reference to a line that passes through a leading end Sa of the slit S and is parallel to the longitudinal direction of the thermal protector 100. In the second terminal 120, the main body 121 is bent downward relative to the extension 122, with reference to a line that passes through a leading end Sa of the slit S and is parallel to the longitudinal direction of the thermal protector 100. Thus, the first terminal 110 and the second terminal 120 have undergone cutting and bending by a press machine.

The main body 111 of the first terminal 110 and the main body 121 of the second terminal 120 lie in a first plane. On the other hand, the extension 112 of the first terminal 110 and the extension 122 of the second terminal 120 lie in a second plane. An angle formed by the first plane and the second plane is an acute angle. The angle of this corner is preferably within a range of 30 degrees to 60 degrees, and more preferably 45 degrees. A line of intersection between the first plane and the second plane is parallel to the longitudinal direction of the thermal protector 100.

An end of the extension 112 of the first terminal 110 on the inner side in the longitudinal direction and an end of the extension 122 of the second terminal 120 on the inner side in the longitudinal direction are held by an insulation block 3 made of resin. A fixed contact 113 is provided on an upper surface of the extension 112 of the first terminal 110 (a surface directly opposite from a surface mounted to the insulation plate 9). Thus, the extension 112 also constitutes a fixed contact support part.

The thermal protector 100 further includes a movable plate 4 that is electrically conductive and elastically deformable. The movable plate 4 is secured at its base end to the extension 122 of the second terminal 120. Thus, the extension 122 also constitutes a movable plate support part. A movable contact 41 that contacts the fixed contact 113 at normal times when the hair dryer is not experiencing an abnormality is provided at a leading end of the movable plate 4.

A bimetal 5 is disposed on an upper surface of the movable plate 4, at a central part between the base end and the leading end. The bimetal 5 is engaged with the movable plate 4 by a total of four tabs 4*a* to 4*d* provided at both ends of the central part of the movable plate 4 in a longitudinal direction and at both ends thereof in a width direction. When an ambient temperature of the thermal protector 100 is equal to or lower than a predetermined temperature, the bimetal 5 is warped so as to be convex upward, and the movable contact 41 is in contact with the fixed contact 113 under an elastic force of the elastically deformable movable plate 4.

The bimetal 5 is activated to invert so as to be convex downward when the ambient temperature exceeds the predetermined temperature due to abnormal heat generation of the hair dryer resulting from overload etc. When the bimetal 5 is activated to invert, the leading end of the movable plate 4 is lifted up by a warping force of the bimetal 5. As a result, the movable contact 41 is separated from the fixed contact 113, so that the current applied to the hair dryer stops.

One example of the manufacturing process of the thermal protector 100 will be described below.

In a first step, die-cutting of a flat metal material is performed.

In a second step, the fixed contact 113 is mounted. Here, a central part between a part to become the first terminal 110 and a part to become the second terminal 120 is held by a frame that is held by carriers.

In a third step, cutting and bending is performed on the part to become the first terminal 110 and the part to become the second terminal 120. Here, the cut and bent portions are also held by the frame. As will be described later, it is preferable that lines of bending lie on the same straight line. Processing is sequentially performed using a die. The first step to the third step are pressing steps.

In a fourth step (molding step), the insulation block 3 is injection-molded so as to integrate the first terminal 110 and the second terminal 120. The molded part is held by the frame.

In a fifth step, a part held by the frame that has been fixing the insulation block 3 is cut off.

In a sixth step, the movable plate 4 carrying the bimetal 5 is fixed by welding.

In a seventh step, the thermal protector main body is cut away from the carriers. The fifth step to the seventh step are assembly steps.

The fixed contact 113 is secured to a predetermined position by resistance welding or caulking. The movable plate 4 is secured to the extension 122 of the second terminal 120 after the insulation block 3 is molded. As the securing method, resistance welding or caulking as with the fixed contact 113 may be used, or these methods may be used in combination. The bimetal 5, which is installed on the movable plate 4, may be installed on the movable plate 4 before it is secured.

The tabs (reference signs 4*a*, 4*b*) serving as points of action when the bimetal 5 drives the movable plate 4 are provided at both ends in the longitudinal direction of the central part of the movable plate 4 between the base end and the leading end. The bimetal 5 is not fixed at one of these tabs. At the other tab, the moment the bimetal 5 inverts its warping direction, the bimetal presses against a back side of this tab and drives the movable plate 4. As the cantilevered movable plate 4 is lifted, the contact is opened and the current is shut off.

The above embodiment offers the following advantages.

(1) The inclination at the predetermined angle of the fixed contact support part and the movable plate support part relative to the mounting surface of the thermal protector 100 is realized by cutting and bending. Two-step bending as in the related art is not required in this embodiment. Thus, the complexity of processing of parts and the complexity of the structure can be reduced.

(2) In the related art, 90-degree bending is performed twice to dispose the bimetal at an angle relative to the mounting surface of the thermal protector. In this embodiment, by contrast, cutting and bending once suffices, and the influence of bending can be reduced.

(3) Disposing the bimetal at an angle relative to the mounting surface of the thermal protector allows the thermal protector to be installed at the corner of the insulation plate farthest away from a heater wire (a radially central part of a heater unit). In the heater unit, an air volume at the radially central part is generally smaller than an air volume on an outer side. Therefore, during normal use of an electrical product equipped with the thermal protector, the thermal protector senses less of the heat of the heater, while it can quickly sense an abnormality in the event of an abnormality of the electrical product, such as a decrease in air flow speed.

In most bimetallic thermal protectors, when they are activated, the leading end of the bimetal on the side where the movable contact is provided warps upward. Therefore, a heater unit having a relatively small shell diameter, such as a hair dryer, faces the challenge of how to secure an insulation distance between the movable contact and the heater wire upon activation. One solution to this challenge is, as described in (3) above, to dispose the bimetal at an angle relative to the mounting surface of the thermal protector and install the thermal protector at the corner of the insulation plate farthest away from the heater wire. Thus, the thermal protector is installed at an almost central part of the heater unit.

Second Embodiment

Figure 5:
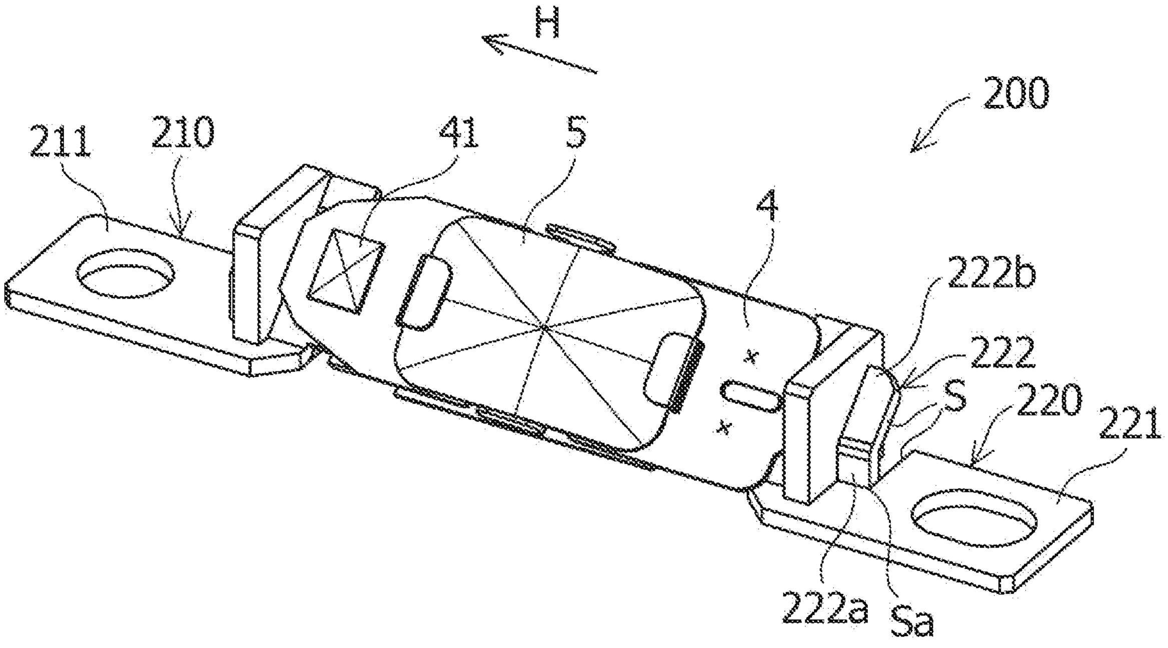
FIG. 5 is a perspective view of a thermal protector in a second embodiment.
Figure 6:
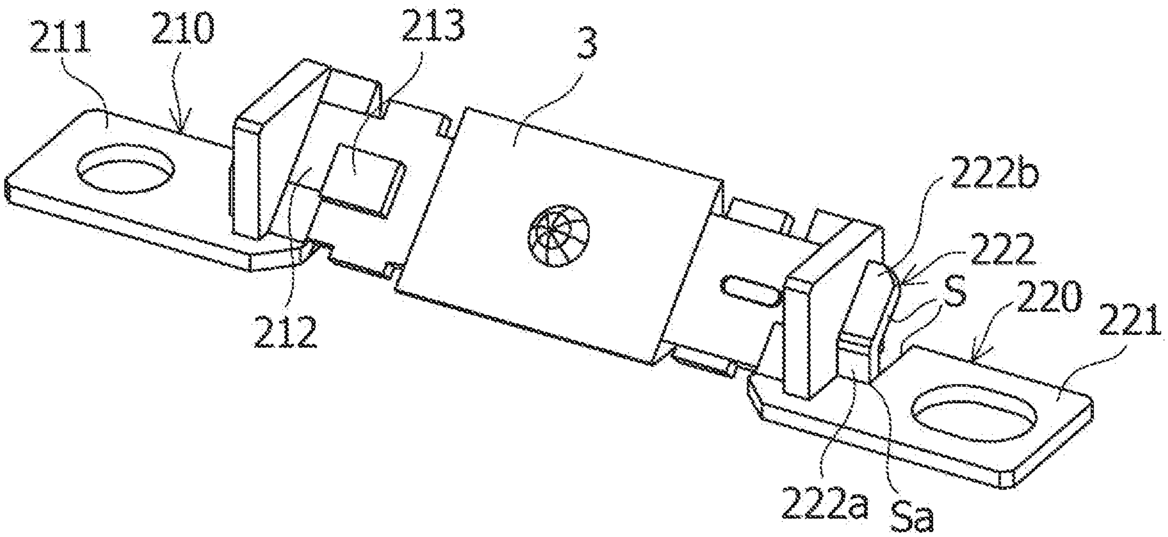
FIG. 6 is a perspective view of the thermal protector in the second embodiment, before a movable plate carrying a bimetal is secured thereto.
Figure 7:
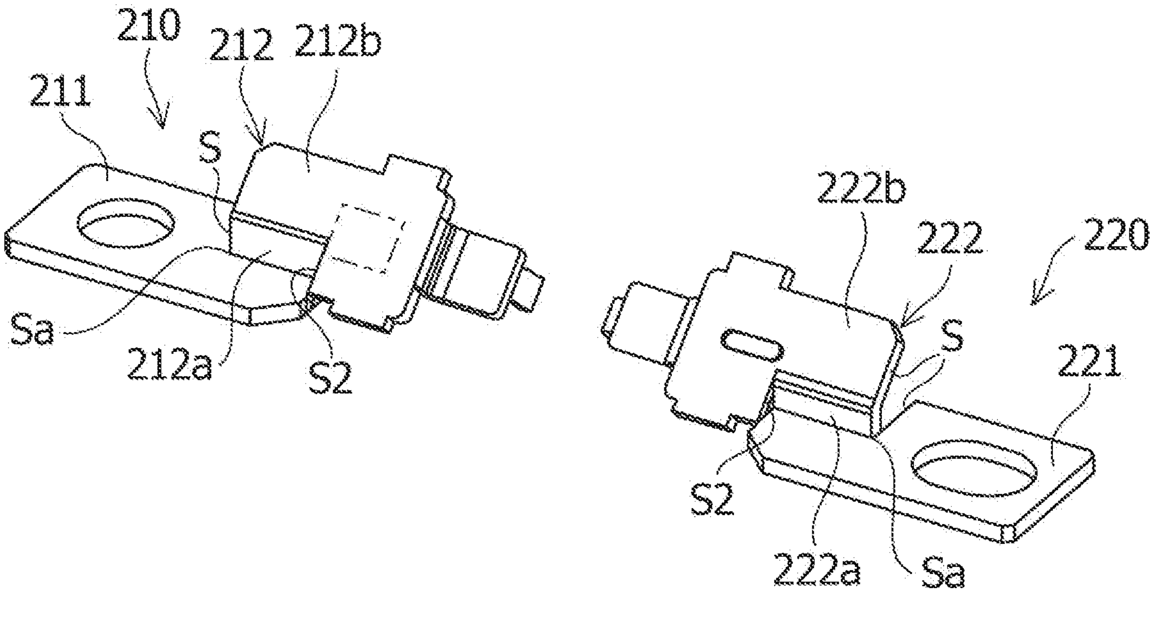
FIG. 7 is a perspective view showing a first terminal and a second terminal of the thermal protector in the second embodiment.

FIG. 5 to FIG. 7 show a thermal protector 200. The same elements as in the first embodiment will be denoted by the same reference signs and detailed description thereof will be omitted.

A second terminal 220 includes a main body 221 and an extension 222. The extension 222 of the second terminal 220 has a raised part **222*a* and a movable plate support part 222*b*. The raised part 222*a* lies in a third plane that is orthogonal to the first plane and parallel to the longitudinal direction of the thermal protector 200. A base portion of the raised part 222*a* adjoins the leading end Sa of the slit S and the movable plate support part 222*b* is connected to a top of the raised part 222*a***.

A similar description applies to an extension 212 of the first terminal 210. Specifically, the first terminal 210 includes a main body 211 and the extension 212. The extension 212 of the first terminal 210 has a raised part **212*a* and a fixed contact support part 212*b*. The raised part 212*a* lies in the third plane. A base portion of the raised part 212*a* adjoins the leading end Sa of the slit S, and the fixed contact support part 212*b* is connected to a top of the raised part 212*a***.

In manufacturing, the raised parts are formed by 90-degree bending, and 45-degree bending is performed at the tops of the raised parts. As a result, the extension of each terminal is inclined at a predetermined angle relative to the main body. This two-point bending can be performed at one time in a press-working process. Thus, two-point bending can be performed by labor equivalent to that of one-point bending. This processing allows 90-degree bending to be performed at a central portion of each terminal in the width direction.

In the first terminal 210 and the second terminal 220, a second slit S2 may be additionally provided farther on the inner side in the longitudinal direction than the slit S. The second slit S2 is formed between the main body and the extension so as to extend in the width direction from one end of two ends of the terminal in the width direction that is on the opposite side from the side of the corner of the insulation plate 9. The second slit S2 is provided such that a leading end of the second slit S2 is located on a line that passes through the tops of the raised parts **212*a*, 222*a* and extends in the longitudinal direction of the thermal protector 200. When such second slits S2 are provided, a width required for a current to the fixed contact support part 212*b* and the movable plate support part 222*b*** can be sufficiently secured.

Third Embodiment

Figure 8:
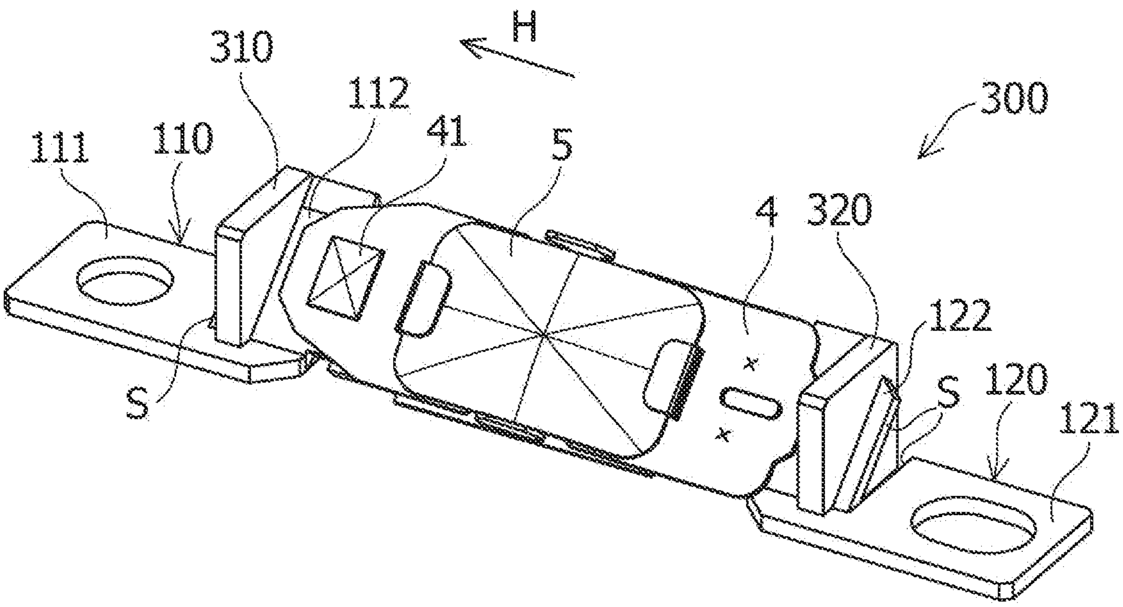
FIG. 8 is a perspective view of a thermal protector in a third embodiment.

FIG. 8 shows a thermal protector 300. The same elements as in the first embodiment will be denoted by the same reference signs and detailed description thereof will be omitted. Air regulation plates 310, 320 are provided respectively near the slit S of the first terminal 110 and near the slit S of the second terminal 120. These air regulation plates are resin plates extending in the width direction and the up-down direction of the thermal protector 300. The dimensions of the air regulation plates in the width direction and the height direction are determined such that the fixed contact (not shown in FIG. 8; reference sign 113 in FIG. 2), the movable contact 41, the movable plate 4, and the bimetal 5 are disposed in a region between the air regulation plates. The thickness of the air regulation plates (the dimension in the longitudinal direction) is not particularly restricted, and 1 mm or so suffices. The air regulation plates can be provided so as to be integrated with the insulation block (not shown in FIG. 8; reference sign 3 in FIG. 2).

According to this embodiment, when the thermal protector 300 is seen along the air flow direction H, a switch mechanism (the fixed contact 113, the movable contact 41, the movable plate 4, and the bimetal 5) is hidden by the air regulation plates. Thus, the flow of hot air is regulated by the air regulation plates such that the hot air does not directly hit the switch mechanism. Thus, the thermal protector 300 is less likely to malfunction while the electrical product is in a normal state.

Fourth Embodiment

Figure 9:
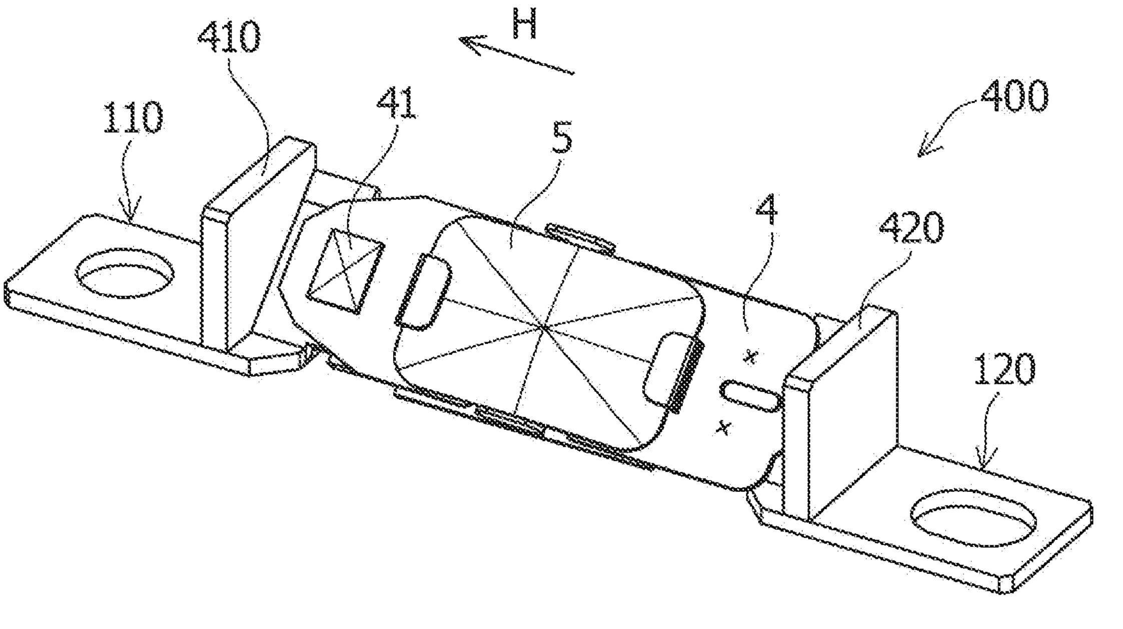
FIG. 9 is a perspective view of a thermal protector in a fourth embodiment.

FIG. 9 shows a thermal protector 400. The thermal protector 400 includes air regulation plates 410, 420. The air regulation plates are provided so as to include the slits (not shown in FIG. 9; reference sign S in FIG. 8). As the main body and the extension of each terminal are bound together with higher unity by the air regulation plate, the strength is enhanced.

Fifth Embodiment

Figure 10:
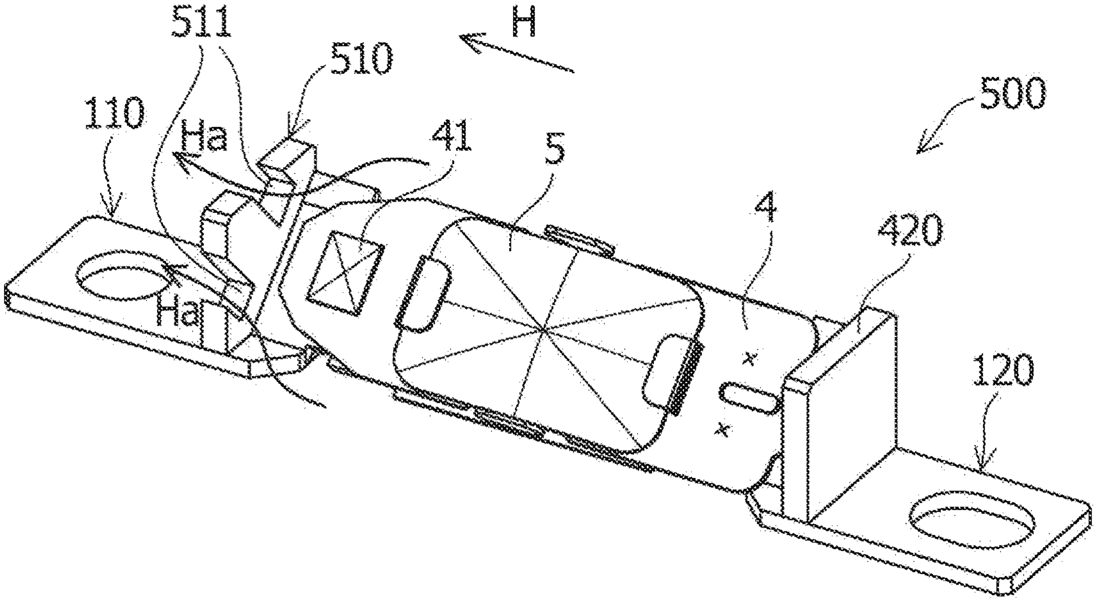
FIG. 10 is a perspective view of a thermal protector in a fifth embodiment.

FIG. 10 shows a thermal protector 500. An air regulation plate 510 is provided in the first terminal 110 so as to include the slit S. The air regulation plate 510 has cuts 511. There may be a plurality of cuts. The cut preferably has a depth down to an upper surface of the extension of the terminal and a width equal to the thickness of the air regulation plate 510.

According to this embodiment, hot air flows from the periphery of the contacts toward the cuts 511 as indicated by arrows Ha. Arcs generated between the fixed contact (not shown in FIG. 10; reference sign 113 in FIG. 2) and the movable contact 41 when the current is shut off is guided by this hot air toward the cuts 511. Thus, parts around the thermal protector 500 are less likely to be damaged due to arcing.

In electrical products that combine a heater part using a nichrome wire and an air blower part formed by a motor, particularly such as hair dryers and warm-air hair curlers, the recent requirements for heaters, including higher output power, higher air volume and air pressure, and design quality, are raising the level of difficulty of setting the thermal protector. There is a growing need for thermal protectors to instantly operate and shut off the current when an abnormal state arises, but not operating during normal use. Since thermal protectors shut off the current by switch operation, generation of arcs upon shutoff, and changes in the insulation distance due to upward warping of the movable plate after shutoff also have bearing on the rising level of difficulty in terms of electrical safety design.

Each of the above embodiments is intended to solve such problems. Inclining the switch mechanism relative to the mounting surface of the thermal protector allows the thermal protector to be disposed at the corner of the insulation plate that is formed by combining two mica plates at 90 degrees. Thus, the thermal protector can be installed at a position farthest away from the heater wire when the tubular heater unit is seen from the axial direction. Consequently, the mica plates are located on both sides of the switch mechanism in the width direction. In the case of a propeller fan, the flow speed of air blown by rotation of the motor is lower at a central part and higher at an outer peripheral part where the heater wire is mounted. As a result, during normal operation, hot air flows near the outer peripheral part of the heater where the heater wire is dense, while the central part where the thermal protector is disposed is less likely to be affected by heat.

In the event of an abnormality in an electrical product, when the air volume decreases due to causes such as the hot-air discharge side being at an extremely short distance to a target, the suction opening being blocked with dust, or the motor rotating at a lower rate, not only does the discharge temperature become high but heat starts to be retained also inside the heater unit. When a limit is exceeded, the thermal protector is activated and the heater current is shut off. Here, arcs are generated between the contacts. Given the recent higher output power, a current as high as over 10 amperes is shut off, and accordingly, arcs have a significant influence. Depending on the mounting state of the thermal protector, an accident may occur in which arcs are carried away by a strong air flow and electricity is discharged to the nearby nichrome wire. This can lead to problems such as the nichrome wire melting and breaking or the movable plate of the thermal protector being damaged.

According to each of the above embodiments, in a heater in which a nichrome wire is wound into a coil, the thermal protector can be mounted at a position farthest away from the nichrome wire. Furthermore, the mica plates are present as walls on both sides. Thus, upon shutoff, arcs are less likely to scatter in the width direction. Since air flows along the mica plates, arcs tend to flow along the air. Providing cuts in the air regulation plate near the contacts as in the thermal protector 500 can provide an escape route for arcs, so that arcs can be safely controlled.

The thermal protector in each of the above embodiments can also be installed in an electrical product other than a hair dryer. For example, it may be installed in an electronic fan heater or a popcorn machine.

Figure 2:
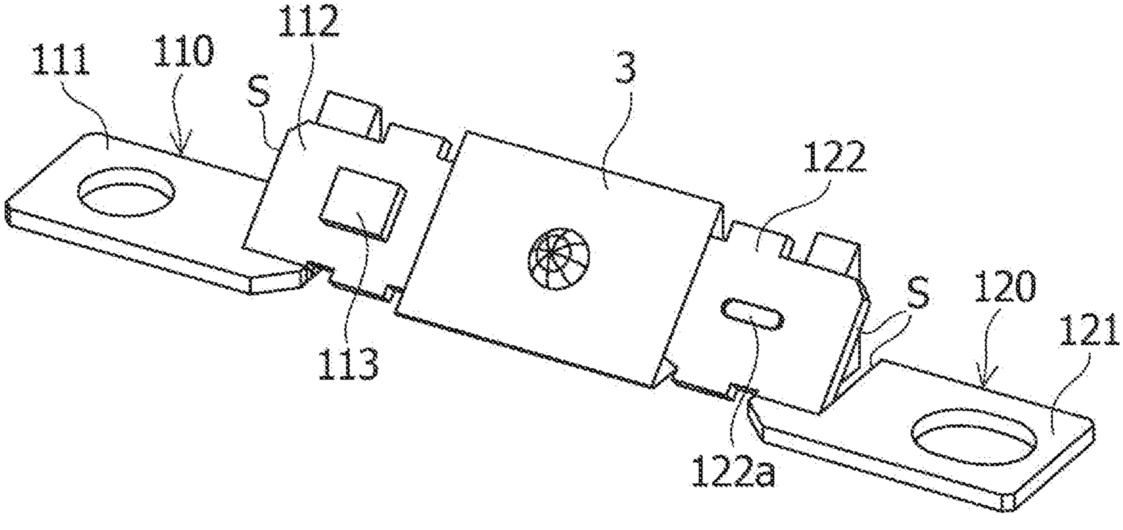
FIG. 2 is a perspective view of the thermal protector in the first embodiment, before a movable plate carrying a bimetal is secured thereto.
Figure 3:
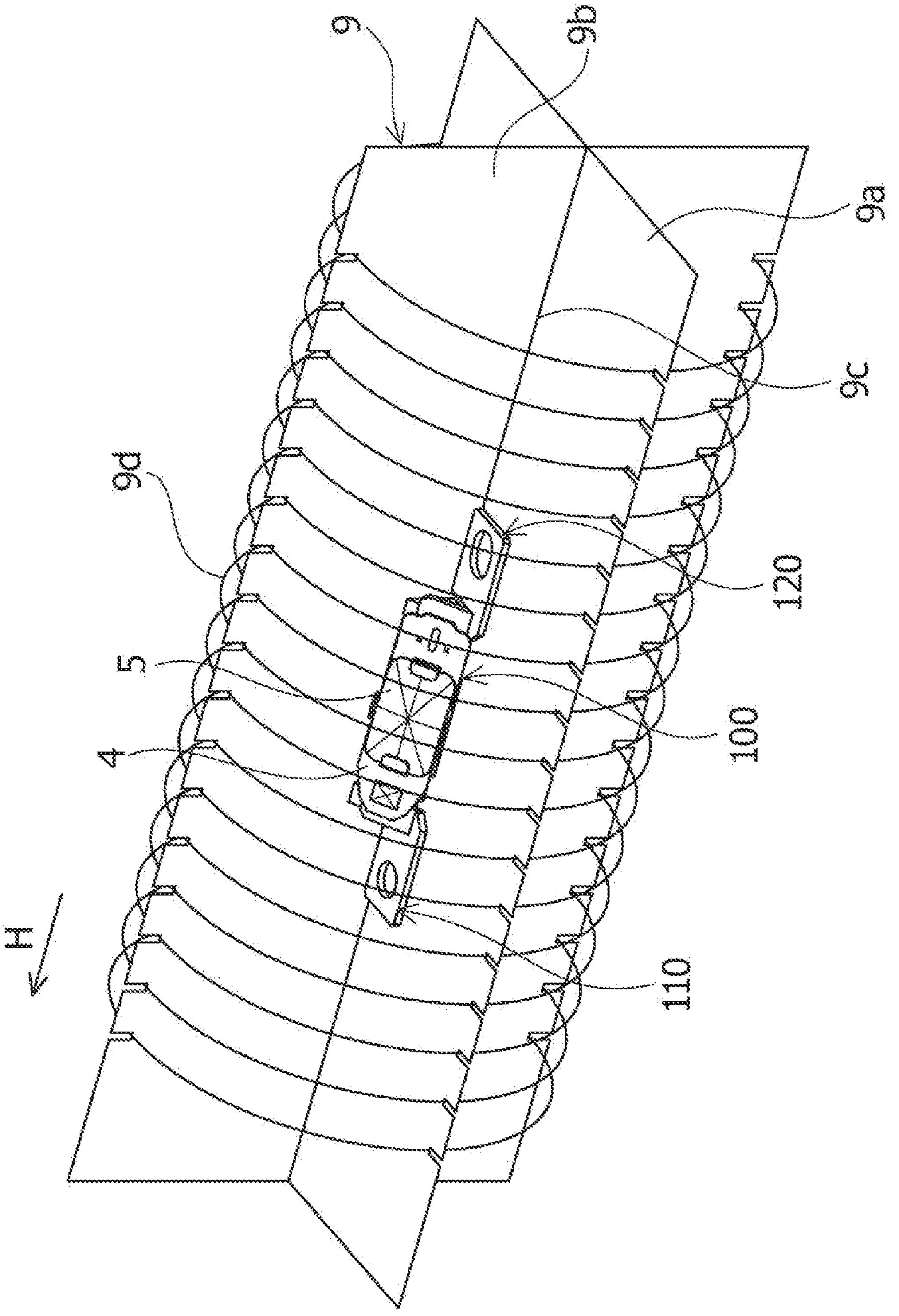
FIG. 3 is an illustration showing an example of mounting of the thermal protector.
Figure 4:
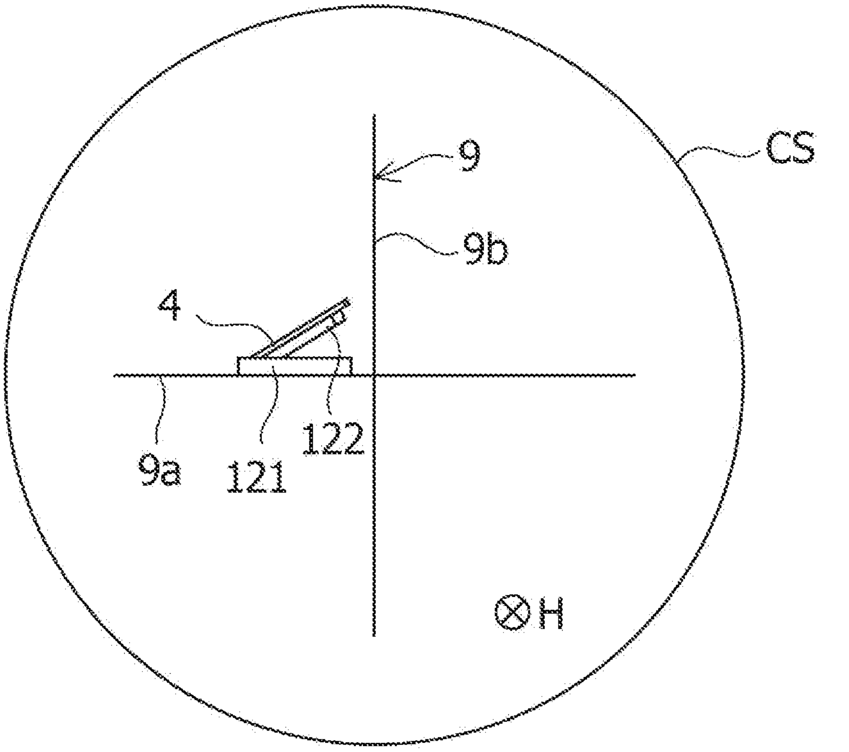
FIG. 4 is another illustration showing the example of mounting of the thermal protector.

For installation of the movable plate, a guide 122*a* of an elongated circular shape can be provided in the extension 122 of the second terminal 120 (FIG. 2). A hole is provided at a base end of the movable plate 4 so as to correspond to this guide 122*a*, and the hole is engaged with the guide. After resistance welding is performed, an upper part of this guide can be crushed to use it as a holder for the movable plate 4.

Thus, an elongated circular guide for positioning the movable plate 4 is provided in the movable plate support part of the extension 122 of the second terminal 120. This guide can be provided parallel to the longitudinal direction of the thermal protector. The length of the guide can be three or more times the width thereof.

Figure 11:
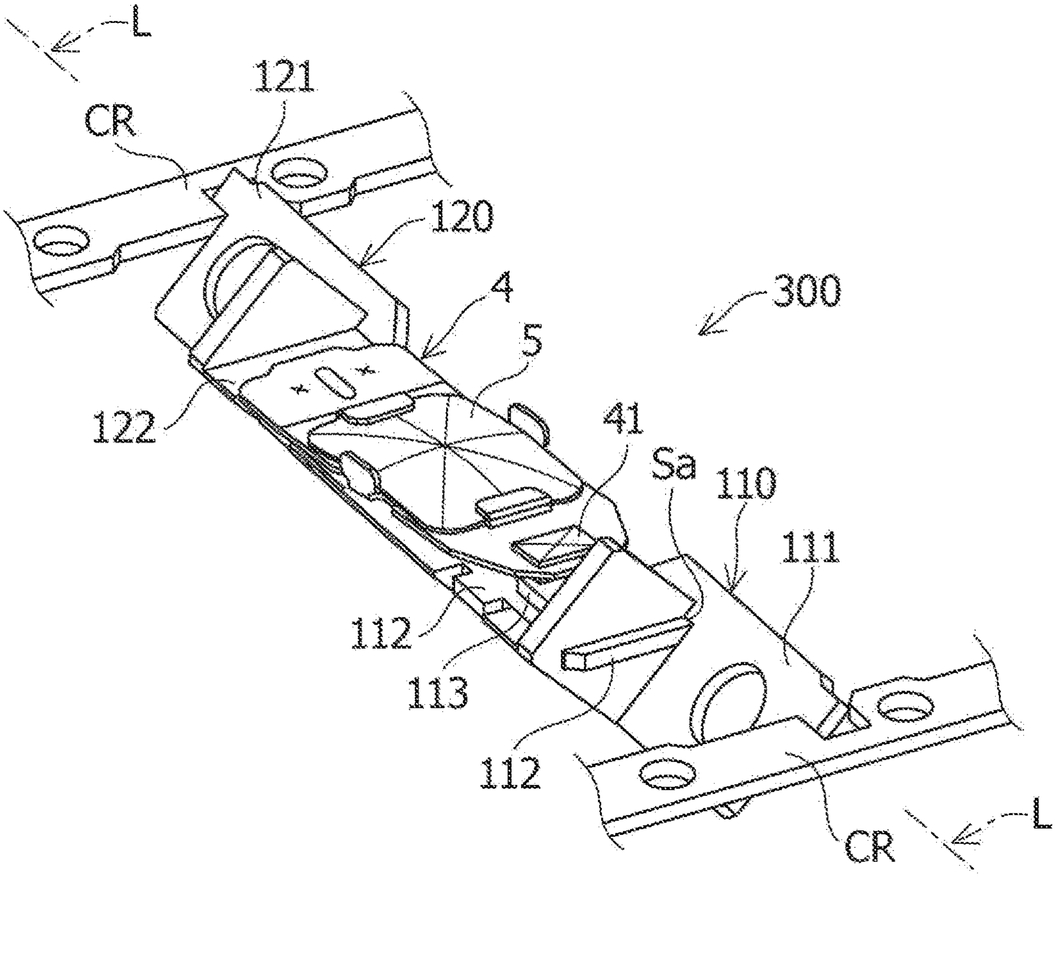
FIG. 11 is an illustration showing a manufacturing process of a thermal protector.

Additionally, manufacturing of the thermal protector will be described. In the case in which parts are coupled during production, as shown in FIG. 11, parts are continuously produced while being coupled by carriers CR on outer sides of the terminals. From the perspective of stable production, it is preferable that surfaces of the carriers CR be flush with the extensions of the terminals. A connection part between the carrier and each terminal also needs to be bent to a predetermined angle. It is preferable that bending at a total of four locations by cutting and bending to a predetermined angle be performed on the same line L to mitigate distortion.

Regarding the embodiments having been described so far, the following additional statements are disclosed.

Additional Statement 1

A thermal protector including:

a first terminal and a second terminal that are provided at both ends in a longitudinal direction and connected to an external circuit;

an insulation block that holds the first terminal and the second terminal;

a fixed contact and a movable contact capable of coming into contact with each other;

a movable plate having the movable contact provided at a leading end; and a bimetal engaged with the movable plate, wherein:

each of the first terminal and the second terminal has a main body, an extension, and a slit extending between the main body and the extension in a width direction of the thermal protector;

the fixed contact is provided in a fixed contact support part of the extension of the first terminal;

a base end of the movable plate is secured to a movable plate support part of the extension of the second terminal;

the main body of the first terminal and the main body of the second terminal lie in a first plane;

the fixed contact support part and the movable plate support part lie in a second plane; and an angle formed by the first plane and the second plane is an acute angle.

Additional Statement 2

The thermal protector according to Additional Statement 1, wherein:

each of the extension of the first terminal and the extension of the second terminal further has a raised part, and the raised part lies in a third plane orthogonal to the first plane;

in the extension of the first terminal, a base portion of the raised part adjoins a leading end of the slit, and the fixed contact support part is connected to a top of the raised part; and in the extension of the second terminal, a base portion of the raised part adjoins a leading end of the slit, and the movable plate support part is connected to a top of the raised part.

Additional Statement 3

The thermal protector according to Additional Statement 1 or 2, further including air regulation plates made of resin that are provided near the slit of the first terminal and near the slit of the second terminal and that extends in a width direction and an up-down direction of the thermal protector, wherein the fixed contact, the movable contact, the movable plate, and the bimetal are disposed in a region between the two air regulation plates.

Additional Statement 4

The thermal protector according to Additional Statement 3, wherein the air regulation plate is provided so as to include the slit.

Additional Statement 5

The thermal protector according to Additional Statement 3 or 4, wherein at least one of the two air regulation plates has a cut.

Additional Statement 6

The thermal protector according to any one of Additional Statements 1 to 5, wherein the angle formed by the first plane and the second plane is within a range of 30 degrees to 60 degrees.

Additional Statement 7

The thermal protector according to any one of Additional Statements 1 to 6, wherein a guide of an elongated circular shape for positioning the movable plate is provided in the movable plate support part of the extension of the second terminal, and a length of the guide is three or more times a width of the guide.

While embodiments of the present invention have been described above, the present invention is not limited to the described embodiments and various modifications and changes can be made based on the technical idea of the present invention.

REFERENCE SIGNS LIST

100, 200, 300, 400, 500 Thermal protector
110 First terminal
111 Main body
112 Extension
113 Fixed contact
120 Second terminal
121 Main body
122 Extension
4 Movable plate
41 Movable contact
5 Bimetal
S Slit
H Air flow direction

The invention claimed is:

1. A thermal protector comprising:

a first terminal and a second terminal that are provided at both ends in a longitudinal direction and connected to an external circuit;

an insulation block that holds the first terminal and the second terminal;

a fixed contact and a movable contact capable of coming into contact with each other;

a movable plate having the movable contact provided at a leading end; and a bimetal engaged with the movable plate, wherein:

each of the first terminal and the second terminal has a main body, an extension, and a slit extending between the main body and the extension in a width direction of the thermal protector, the slit extending from an edge of the main body and an edge of the extension to a leading end, the main body bent downward relative to the extension with reference to a line passing through the leading end and parallel to the longitudinal direction;

the fixed contact is provided in a fixed contact support part of the extension of the first terminal;

a base end of the movable plate is secured to a movable plate support part of the extension of the second terminal;

the main body of the first terminal and the main body of the second terminal lie in a first plane;

the fixed contact support part and the movable plate support part lie in a second plane; and an angle formed by the first plane and the second plane is an acute angle.

2. The thermal protector according to claim 1, wherein:

each of the extension of the first terminal and the extension of the second terminal further has a raised part, and the raised part lies in a third plane orthogonal to the first plane;

in the extension of the first terminal, a base portion of the raised part adjoins a leading end of the slit, and the fixed contact support part is connected to a top of the raised part; and in the extension of the second terminal, a base portion of the raised part adjoins a leading end of the slit, and the movable plate support part is connected to a top of the raised part.

3. The thermal protector according to claim 1, further comprising first and second air regulation plates made of resin that are provided near the slit of the first terminal and near the slit of the second terminal, respectively, and that extends in the width direction and an up-down direction of the thermal protector, wherein the fixed contact, the movable contact, the movable plate, and the bimetal are disposed in a region between the first and second air regulation plates.

4. The thermal protector according to claim 3, wherein the first and second air regulation plates are provided so as to include the slits of the first terminal and the second terminal, respectively.

5. The thermal protector according to claim 3, wherein at least one of the first or second air regulation plates has a cut.

6. The thermal protector according to claim 1, wherein the angle formed by the first plane and the second plane is within a range of 30 degrees to 60 degrees.

7. The thermal protector according to claim 1, wherein a guide of an elongated circular shape for positioning the movable plate is provided in the movable plate support part of the extension of the second terminal, and a length of the guide is three or more times a width of the guide.

* * * * *